United States Patent [19]

Crane

[11] Patent Number: 5,257,190
[45] Date of Patent: Oct. 26, 1993

[54] INTERACTIVE DYNAMIC REALTIME MANAGEMENT SYSTEM FOR POWERED VEHICLES

[76] Inventor: Harold E. Crane, P.O. Box 6356, Kingwood, Tex. 77325

[21] Appl. No.: 745,061

[22] Filed: Aug. 12, 1991

[51] Int. Cl.$^5$ ........................ G01M 15/00; G05B 15/02
[52] U.S. Cl. ........................... 364/424.03; 364/424.02; 364/424.01; 73/117.2
[58] Field of Search ........... 364/424.01, 431.1, 431.11, 364/431.12; 73/116, 117.2

[56] References Cited

U.S. PATENT DOCUMENTS

| | | | |
|---|---|---|---|
| 3,673,588 | 6/1972 | Riff | 340/248 A |
| 4,247,813 | 1/1981 | Gansert et al. | 320/48 |
| 4,258,421 | 3/1981 | Juhasz et al. | 364/424.04 |
| 4,310,888 | 1/1982 | Furuhashi et al. | 364/431.01 |
| 4,316,134 | 2/1982 | Balan et al. | 322/99 |
| 4,334,425 | 6/1982 | Crane | 73/112 |
| 4,342,022 | 7/1982 | Nichol | 340/52 R |
| 4,402,054 | 8/1983 | Osborne et al. | 364/554 |
| 4,757,463 | 7/1988 | Ballou et al. | 365/551.01 |
| 4,843,575 | 6/1989 | Crane | 364/550 |
| 4,891,971 | 1/1990 | Jones et al. | 73/117.3 |
| 4,929,931 | 5/1990 | McCuen | 340/636 |
| 4,939,502 | 7/1990 | Ito et al. | 340/438 |
| 4,965,549 | 10/1990 | Koike | 340/516 |
| 4,990,885 | 2/1991 | Irick et al. | 340/455 |
| 5,003,478 | 3/1991 | Kabayashi et al. | 364/424.03 |
| 5,003,479 | 3/1991 | Kobayashi et al. | 364/424.03 |
| 5,012,421 | 4/1991 | Ishii | 364/431.1 |
| 5,056,023 | 10/1991 | Abe | 364/424.03 |
| 5,072,391 | 12/1991 | Abe | 364/424.04 |

Primary Examiner—Thomas G. Black
Assistant Examiner—Tan Q. Nguyen
Attorney, Agent, or Firm—Foley & Lardner

[57] ABSTRACT

A dynamic realtime management system for a powered vehicle having a microprocessor adapted to sense realtime inputs related to the condition of the powered vehicle. A plurality of input sensors are connected to components of the powered vehicle so as to transmit condition information to the microprocessor. A memory is provided for storing the sensed values of the realtime parameters and storing the programs for defining relationships between certain of the sensed values of the realtime parameters. A display is provided so as to produce a humanly perceivable signal related to the condition information. The microprocessor is interconnected to the display so as to transmit the condition output to the display. The microprocessor is programmed to automatically determine a plurality of unknown values relative to the conditions of the powered vehicle as a function of the sensed values of the realtime parameters. The microprocessor produces an interaction indication result for the purpose of determining the status of the components of the powered vehicle. In this manner, the operator of the powered vehicle as direct access to information generated from the management system in order to enable the operator to make reasonable, logical management decisions so as to cure costly problems and inefficiencies quickly and reliably.

9 Claims, 5 Drawing Sheets

FIG. 1

1 ALTERNATOR BELT
2 BATTERY
3 ALTERNATOR MOTOR
4 REGULATOR
5 STARTER SWITCH
6 SOLENOID (STARTER)
7 STARTER MOTOR
8 WATER TEMPERATURE
9 WATER PRESSURE
10 WATER PUMP
11 WATER PUMP BELT
12 VOLTAGE-PRESSURE SWITCH
13 COMPRESSOR MOTOR OUTPUT
14 COMPRESSOR BELT
15 AIR COND./BLOWER MOTOR
16 FREON LEVEL
17 COOLING TEMPERATURE

39 TORQUE
40 RPM
41 HORSEPOWER
42 SPEED (AIR)
43 HEIGHT/ALTITUDE

20 LOAD
21 DISTANCE
22 COSTS FUEL ETC.
23 SCHEDULE
24 LABOR COSTS
25 REPAIR COSTS
26 STOPS
27 TIME
28 FUEL FLOW

INTERACTIVE DYNAMIC REALTIME MANAGEMENT SYSTEM FOR POWERED VEHICLES

TECHNICAL FIELD

The present invention relates to the operation and management of powered vehicles which utilize batteries and engine systems. More particularly, the present invention relates to a realtime management system for identifying system inefficiencies and subsystems requiring repair through the use of realtime interactive computer analysis.

BACKGROUND ART

The powered vehicles referred to in this application include ships, locomotives, aircraft of all types, and automotive vehicles such as cars, trucks and buses. The powered vehicles employ starter systems, battery systems, charging systems, and cooling systems for the efficient and effective operation of such vehicles. Degradation of system components of the powered vehicle result in the inability to start the vehicle. Additionally, the degradation in the system components can also cause the vehicle to run improperly or cause the operator to be unable to effectively use the powered vehicle.

Various techniques have been employed in the past to monitor particular components of the powered vehicle. Unfortunately, translation and interpretation is always left to a mechanic, or other person, to analyze the problem and make a recommendation as to repair. There is usually no monitor of the translation and interpretation carried out by the mechanic. All known monitoring systems are single purpose measuring devices. They do not compare other measurements at the same time and interact the effects of each of the components. As such, synergistic or combination effects are ignored in traditional monitoring systems. Typical monitoring systems only indicate one specific matter or suggest a general problem. Present monitoring systems do not provide a constant realtime reading continually throughout the monitoring of the components of the system.

Monitor-type systems provide only "after the fact" information. For example, if a component of the powered vehicle is degrading, a red light or warning buzzer will indicate to the operator of the vehicle that the operator should do something about the component. The monitor-type systems do not explain, in realtime, exactly what the problem is and what to do with the problem. Automobile manufacturers provide light or buzzer warnings or a lighted graphic of the area of the problem. When the trouble is diagnosed as to the specific problem, then the repair will cause the indicator light to turn off.

With regard to specific systems within an automobile, it becomes very difficult to analyze specific problems as they are occurring throughout the automobile's engine system. For example, in a vehicle air conditioner, the only indication of an air conditioner problem is when the air delivered from the air conditioner is not cooled. It is necessary to consult a mechanic so as to determine what the problem is. As another example, with the water motor cooling system, a light on the automobile dashboard will illuminate so as to inform the operator that the motor is overheating. Once again, the mechanic must be employed so as to determine the specific problem. After repairs are made, the light will no longer be illuminated. With respect to the battery system of a vehicle, the battery light provides an indication of a problem. However, a mechanic must be employed so as to locate the particular area of difficulty. Any problem with battery systems can originate in the battery, the charger, the cutout, or in overloads. Many times, the mechanic must continually change out parts until the specific cause of the battery problem is located. With respect to the starter system of a vehicle, the indicator light will be illuminated when the automobile will not start. A mechanic must be employed so as to figure out if the problem is the wiring, the starter, the solenoid, or the battery.

U.S. Pat. No. 4,843,575 was issued on Jun. 27, 1989, to the present inventor. U.S. Pat. No. 4,843,575 describes an "Interactive Dynamic Realtime Management System". This system was configured for the purposes of sensing the degradation of system components in a powered system. The invention described in this patent utilizes a plurality of powered systems and a central management facility. Each of the powered systems includes a processor which receives inputs from realtime sensors relating to realtime variables affecting the operation of the powered system. A monitoring memory is provided for the processors to store the data related to the realtime input a well as data related to manual inputs for fixed parameters. An interactive terminal is also provided. The local processor is programmed to determine various efficiency-related parameters based upon presently measured variables as well as stored historical data relevant to the presently measured variables. The stored historical data is used to give an indication of the present relative state of the parameters of interest. The local processors are programmed to calculate the costs of presently occurring inefficiencies in order to provide the operator of each powered system with data on which to make a decision concerning the control of the power plant. In particular, the operator is provided with information which analyzes that a subsystem is operating inefficiently and the cost of the inefficient operation in units of capital expended per lapse of time. In this manner, the operator is able to make immediate decisions to change certain control parameters so as to notice an immediate increase or decrease in efficiency.

The invention of U.S. Pat. No. 4,843,575 had particular application to the marine industry where it was used to determine certain factors as cost of hull degradation, engine performance, shallow water power levels, efficiency of rudder and steering systems, trim and ballasting underway and electrical power generation. The dynamic interactive realtime management system of powered vehicles of the present invention is based, in part, on the technology of U.S. Pat. No. 4,843,575. U.S. Pat. No. 4,843,575 is incorporated by reference herein.

U.S. Pat. No. 4,334,425 was issued on Jun. 15, 1982 to the present inventor. U.S. Pat. No. 4,334,425 provided a system for indicating the presence of fuel penalties brought on by inefficient power plant components or degradation in performance of components. The system of this patent was adapted for use in marine applications. It utilizes strategically located continuous operating sensors. The information from these sensors was sampled and analyzed to produce an output representative of the plant efficiency at the moment. The outputs include indications of fuel use per hour, fuel consumption per distance traveled, and power plant efficiency. A plurality of secondary inputs were provided so as to give indications of the plant operating pressures, temperatures, etc. When a fuel penalty is indicated, the secondary inputs were evaluated to determine any significant change in output levels thus giving evidence as to the location of the source of the fuel penalty.

Various systems have been developed in the past for the monitoring of specific conditions affecting an automobile battery. For example, U.S. Pat. No. 3,673,588, issued on Jun. 27, 1972, to J. A. Riff, shows an indicating circuit for use in a vehicle's electrical system. This device employs one or more indicating lamps to give a visual indication of the various operating conditions of the dynamoelectric machine so as to indicate failure of an alternator or regulator component or to indicate below normal, normal, or above normal voltage outputs therefrom. U.S. Pat. No. 4,247,813, issued on Jan. 27, 1981, to Gansert et al. describes an on-board vehicular electrical power supply system. This invention utilizes an LED which is triggered to illuminate upon response of one of two threshold sensing circuits which sense undervoltage and overvoltage conditions of the battery beyond a predetermined voltage range. U.S. Pat. No. 4,316,134, issued on Feb. 16, 1982, to Balan et al. shows a fault-indicating circuit for an automobile alternator battery charging system. The fault indicating circuit utilizes a low-voltage detector circuit which provides constant DC excitation for an indicator lamp in response to low alternator output voltage and a high voltage detector circuit which provides intermittent excitation for the lamp in response to an excessively high alternator output voltage. The lamp is maintained in a de-energized state in response to the normal alternator output voltage. U.S. Pat. No. 4,342,022, issued on Jul. 27, 1982, to T. Nichol shows a warning lamp which is connected in a collector circuit of the Darlington transistor which is energized if the alternator does not produce an output or a malfunction occurs in the charging system. U.S. Pat. No. 4,929,931, issued on May 29, 1990, to S. W. McCuen shows a battery monitor including a voltage measuring means for measuring the voltage of the battery and a processor which is coupled to this voltage measuring means. The processor utilizes the voltage measurement to determine the presence or absence of the battery, whether the battery voltage is equal to or greater than a nominal voltage level, and whether the discharge rate of the battery is greater than a selected discharge rate. U.S. Pat. No. 4,939,502, issued on Jul. 3, 1990, to Ito et al. shows a fail-safe control device which detects the battery voltage, stores a standard battery voltage, and makes a comparison between the battery voltages so as to switch to an emergency mode of turning off the shift solenoids when the voltage deviates from the standard upon the comparison. U.S. Pat. No. 4,965,549, issued on Oct. 23, 1990, to T. Koike provides a warning device for an internal combustion engine which operates from the engine ignition circuit upon initial starting so as to provide self-checking of the engine. U.S. Pat. No. 4,990,885, issued on Feb. 5, 1991, to Irick et al. shows an auxiliary battery monitor. In this auxiliary battery monitor, the voltage differential between the primary and auxiliary sources is measured by coupling them to a voltage comparison device. A pair of voltage dividing resistor pairs provide inputs to an operational amplifier when the voltage differential is above a predetermined value.

It is an object of the present invention to provide a dynamic interactive fully automated realtime management system for enhancing the management and technical operating efficiency of powered vehicles.

It is another object of the present invention to provide a realtime management system in which the operator of a powered vehicle is able to interact with the management system in order to make decisions and to improve the efficiency of the powered system based upon realtime information provided by the management system.

It is another object of the present invention to give the operator of the powered vehicle a continual update of system or parts degradation.

It is another object of the present invention to provide a management system which eliminates the need for diagnostic services.

It is still a further object of the present invention to provide a management system that assists the operator in making a proper decision of the need for repairs and the quality of the repairs.

These and other objects and advantages of the present invention will become apparent from a reading of the attached specification and appended claims.

SUMMARY OF THE INVENTION

The present invention is a dynamic realtime management system for managing the condition of a powered vehicle which comprises a microprocessor for sensing a plurality of realtime parameters associated with the powered system, a memory for storing the sensed values of the realtime parameters and storing a plurality of programs for defining relationships between certain of the sensed values of the realtime parameters, and a display for producing a humanly perceivable signal related to the condition information of the components of the powered vehicle. Suitable input sensors are connected to the components of the powered vehicle so as to deliver condition information to the microprocessor. The microprocessor is programmed to automatically determine a plurality of unknown values relative to the conditions of the powered vehicle as a function of the sensed values of the realtime parameters by individually selecting the unknown values to be determined. The microprocessor determines the interactions between the sensed values using the stored programs. The microprocessor produces an interaction indication result. The microprocessor also produces a condition output indicative of the relationship of the condition information and the interaction indication result. A microprocessor transmits the condition output to the display so that the condition of the components of the powered vehicle can be observed by the operator of the powered vehicle.

A terminal is interconnected to the microprocessor for selecting a desired output to be transmitted to the display. An analog-to-digital converter is connected between the input sensors and the microprocessor so as to convert the analog output of the input sensor into a digital output to the microprocessor. A power source is connected to the microprocessor for supplying a voltage to the microprocessor independent of the power system of the powered vehicle.

The microprocessor is programmed to determine interactions by commanding that certain realtime parameters be held constant so as to act as comparators in order to sense changes in other of the realtime parameters. The terminal allows management information to be input to the microprocessor. The microprocessor interacts this management information with the realtime parameters.

In particular, in the present invention, the powered vehicle is an automobile. The condition output can be the battery condition, the charging system condition, the motor cooling system condition, or the starter condition of the vehicle.

Where the present invention is applied for managing the condition of the starting system, the input sensors comprise a starter motor noise sensor, a starter motor voltage sensor, a starter solenoid sensor, a starter switch sensor, and a battery sensor. Where the management system of the present invention is associated with the motor cooling system of a vehicle, the input sensors comprise a water temperature sensor, a water pump sensor, a water pump belt sensor, and a water pressure sensor. Where the management system of the present invention is applied to the condition of a charging system of a vehicle, the input sensors comprise an alternator motor voltage sensor, an alternator motor belt sensor, and a battery voltage sensor. In each of these instances, the microprocessor interacts each of the inputs from the sensors. The microprocessor is programmed so as to interact the realtime parameters in the event of a single abnormal parameter. The microprocessor transmits a signal to the display indicative of a cause of the single abnormal parameter. The display can also indicate the action which is necessary so as to cure the cause of the single abnormal parameter.

DETAILED DESCRIPTION OF THE INVENTION

Figure 1:
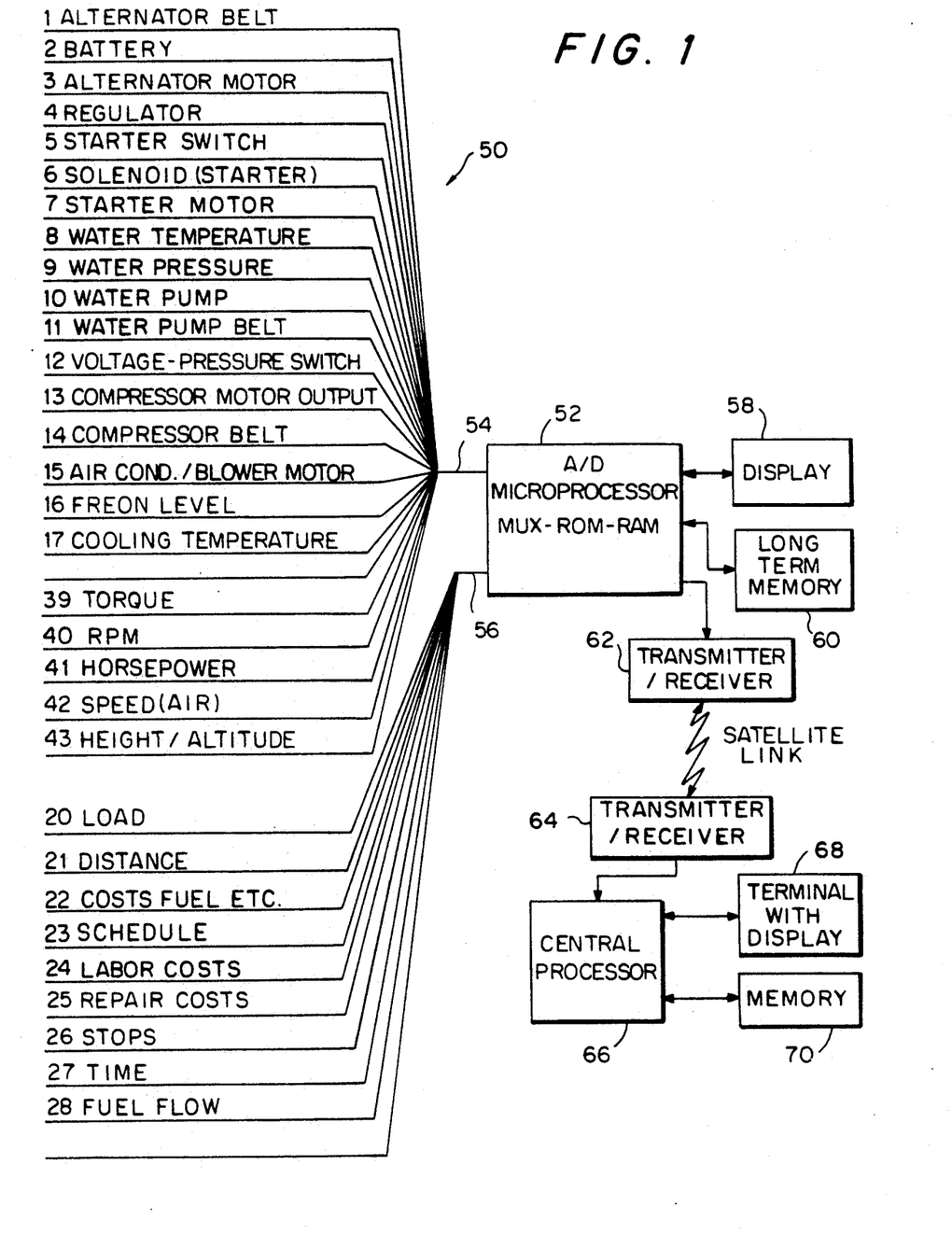
FIG. 1 is a block diagram showing the inputs and outputs for a local processor as well as the transmission link between the local processor and the central processor.

Referring to FIG. 1 there is shown at 50 the dynamic realtime management system in accordance with the preferred embodiment of the present invention. As can be seen, the management system 50 is illustrated in block diagram form. The management system 50 of the present invention is described with reference to its application in automobiles, boats, and helicopters. However, it would be understood that the principles of the invention are also applicable to the control and operation of systems other than automobiles, boats, and helicopters, as will be readily apparent.

In FIG. 1, a local processor 52 is positioned within a vehicle. The processor 52 has a plurality of direct realtime inputs 54. The individual inputs extending to line 54 are identified on lines 1-17 and lines 39-43. Lines 1-17 are in reference to the conditions affecting the engine of an automobile. Lines 39-43 are in particular, applicable to the analysis of conditions affecting a helicopter.

The microprocessor 52 includes a plurality of manual inputs 56. The manual inputs 56 are for management purposes. These manual management inputs are indicated by lines 20-28 in FIG. 1.

The direct realtime inputs 54 are fed directly into the microprocessor 52. As they are fed to the microprocessor, the analog output of each of the sensors associated with the direct realtime input 54 is changed to a digital input into the microprocessor 52. The microprocessor 52 further includes a multiplexer, a ROM memory, and a RAM memory. The memory of microprocessor 52 is suitable for storing the sensed values of the realtime input 54 and for storing a plurality of programs for defining the relationships between the sensed values of the realtime parameters 54. The processed information relating to the realtime inputs 54 is transmitted to a display 58. Display 58 is suitable for producing a humanly perceivable signal relative to the condition of the particular component of the powered vehicle. The display 58 can be a visual monitor showing the condition. Alternatively, the display 58 can be a light or audio signal indicative of the condition. A long-term memory 60 is also connected to the microprocessor 52 so as to store information provided by the microprocessor 52.

If the management system 50 is used in connection with an external monitoring system, then the microprocessor 52 is connected to a transmitter/receiver 62. The transmitter/receiver 62 is suitable for transmitting the signal from the microprocessor 52 to another location 64. For example, the transmitter/receiver 62 can be employed when the vehicle is part of a fleet of vehicles. The transmitter/receiver 62 can be connected to the transmitter/receiver 64 by a suitable satellite link, or other means of communication. The transmitter/receiver 64 passes a signal to a central processor 66. The central processor 66 can deliver the signal to a terminal 68. Terminal 68 includes a display. Terminal 68 is suitable for providing direct input information to the microprocessor 52. As such, suitable management information can be input to the microprocessor 52 such that the management information can be interactive with the realtime input 54. Additionally, a memory 70 is provided for storing the information of central processor 66.

With respect to the direct realtime inputs 54, alternator belt 1 is an input sensor which senses the rotation of the alternator belt. In particular, a voltage from a Hall-effect device determines the rotation of the alternator belt. The sensing of every revolution of the alternator belt is a continuous realtime input to the microprocessor 52. The battery sensor 2 is connected to the automobile battery so as to constantly sense the voltage of the automobile battery. Battery sensor 2 provides voltage information as an input to the microprocessor 52. The battery voltage is read in realtime 250 times per second. The battery voltage is updated every second. The alternator motor sensor 3 provides a realtime input to the microprocessor of whether the alternator motor is operating properly. In particular, the alternator motor sensor 3 senses the alternator output voltage. A regulator sensor 4 is provided so as to provide constant realtime input to the microprocessor 52 of the condition of the regulator. The starter switch sensor 5 senses the start switch voltage and measures such voltage. The measuring of the start switch voltage determines if the switch connects the battery voltage to the starter solenoid and to the starter motor. Starter solenoid sensor 6 senses the voltage to the solenoid so as to determine if the solenoid is defective. Starter motor sensor 7 monitors the starter motor voltage in order to determine that the battery voltage turns the starter motor on. The starter motor sensor 7 also senses that if the battery voltage does not turn the starter motor on and the voltage is still connected to the starter motor, then the starter motor is defective. Water temperature sensor 8 and water pressure sensor 9 are continually monitored to indicate the flow of water and to indicate if the water is being properly cooled. The water temperature sensor 8 and the water pressure sensor 9 will be interactive so as to indicate whether or not there is a leak in the radiator or hoses of the engine. The water temperature sensor 8 and the water pressure sensor 9 will further indicate whether or not the water pump of the engine is working properly. The water pump sensor 10 is monitored by an RPM indicator on the pulley (or by a noise sensor) so as to determine whether the water pump is working properly. If the water pump sensor 10 shows that the water pump is not rotating, then it is an indication that the water pump is broken or that the belt which turns the water pump is broken. The water pump belt sensor 11 is a Hall-effect sensor or a magnetic marker on the water pump belt. Water pump belt sensor 11 determines whether the belt is broken and whether the belt is working properly. The voltage-pressure switch sensor 12, the compressor motor output sensor 13, the compressor belt sensor 14, the blower motor sensor 15, the freon level sensor 16, and the cooling temperature sensor 17 are all continually monitored and fed into the processor 52 to determine any single change which might affect the total air conditioner system. An abnormal reading from the sensors 12-17 would provide an indication of the defect and provide an indication of the need for repair. Voltage pressures and liquid pressures are fed to the processor 52 in realtime.

If the management system 50 is used in connection with the helicopter, then torque sensor 39, RPM sensor 40, horsepower sensor 41, air speed sensor 42, and height/altitude sensor 43 are employed as realtime inputs 54 to the microprocessor 52. The engine speed (RPM) is determined by the shaft speed of the power plant in revolutions per minute by the shaft speed sensor. The shaft speed of any engine in the power system is measured in a similar manner. Horsepower sensor 41 is calculated in realtime as the product of the shaft speed times the torque and divided by a suitable number so as to produce metric horsepower equivalents. Helicopter air speed is furnished by the air speed indicator aboard the helicopter. The altitude is taken from the altimeter sensor on the helicopter. The sensors 39-43 are sensors which are available for connection to the microprocessor 52 and are suitable as processor inputs.

Management inputs 20-28 are various factors that can be provided to the microprocessor so as to properly interact with the realtime data 54. Inputs 20-28 act as "optimizing" variables. These management variables can affect the operator's decision as to whether a repair is needed immediately, the cost of the repair, the economics of the unrepaired engine, and various other factors. The inputs 20-28 are preprogrammed information which are placed in the processor software. Alternatively, the managements inputs 20-28 can be input by terminal 68 directly into the microprocessor. The management inputs 20-28 are software information which are placed into the processor. This predetermined information may be used in conjunction with the realtime inputs 54, if desired. For example, these management inputs can indicate the cost of fuel for operating the air conditioner. They can indicate the labor costs or time taken to have the water pump replaced. These management inputs can also indicate a dead battery, the time to replace a dead battery, plus the time the vehicle is started and moving again. As long as the vehicle is being driven, the system is continually analyzing and sensing the realtime inputs 54. This provides the operator of the vehicle with information never before available.

Figure 5:
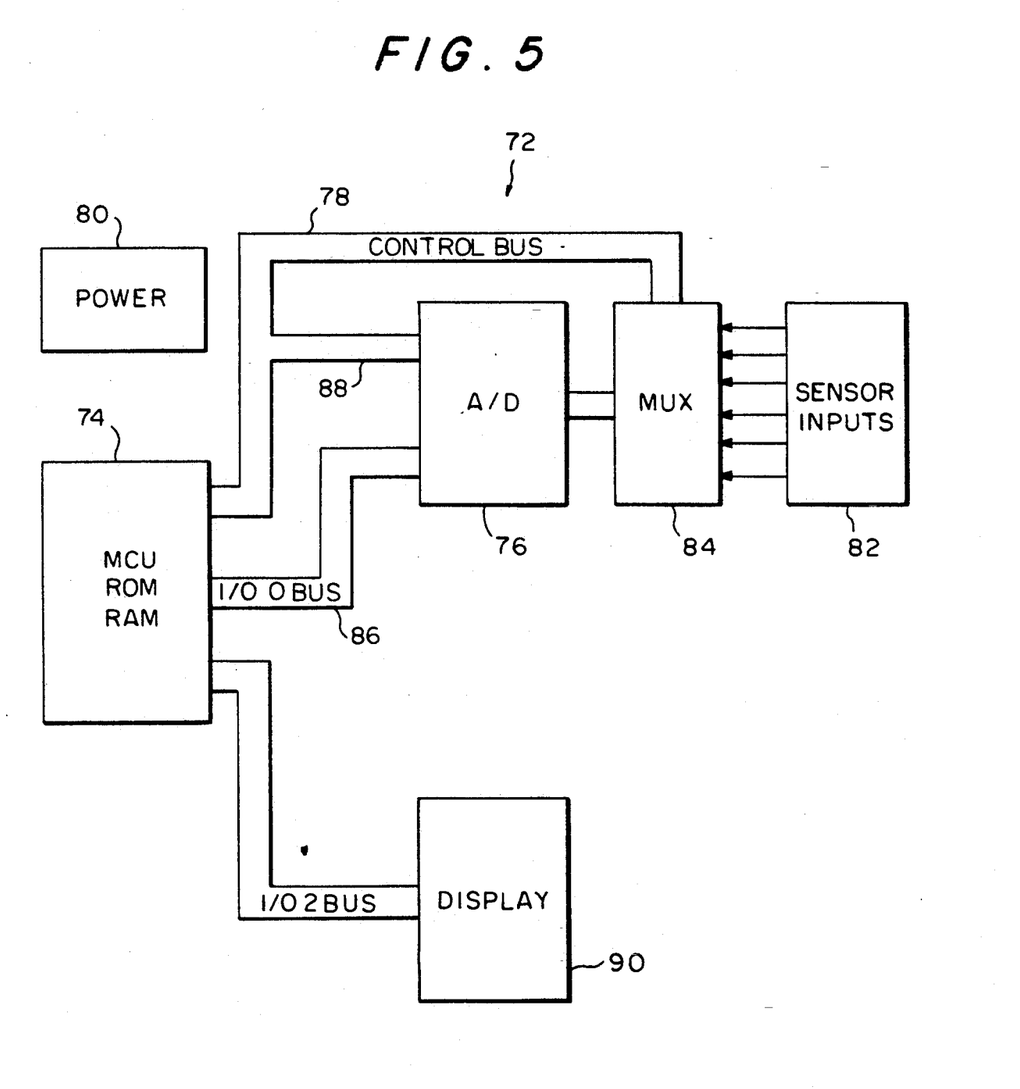
FIG. 5 is a block diagram showing the general system of the present invention.

FIG. 5 illustrates a circuit description 72 of the present invention. The system 72 is configured around a microcontroller 74 which has bits of RAM. The instruction set (software programming) controlling the microcontroller 74 is stored in an EPROM. Any internal computed parameters are stored in the RAM in the microcontroller 74. The input battery voltage is applied to the input of the analog-to-digital converter 76. The accessory and ignition signals are applied to a databus 78 and are used to control the analysis procedure.

In FIG. 5, a power supply 80 is provided. Power supply 80 is suitable for providing an operating current to the microcontroller 74. The power supply 80 should be independent of the power system of the vehicle. The power supply 80 may be a regulated power supply which obtains its power from the car battery. Variations in the condition of the voltage from the car battery do not affect the power output from the power supply 80. Realtime sensors 82 represent the system sensor input modules. The sensor inputs 82 may measure battery voltage, the voltage from a Hall-effect device to verify belt pulley rotation, the voltage across a pressure switch to indicate abnormal pressure in an air conditioning system, etc. The sensor inputs 82 can also be output from a motion sensor or a vibration sensor as part of the vehicle security system. The sensor inputs 82 generally correspond with the sensors indicated in FIG. 1. A time-division data multiplexer 84 receives the signals from the sensor inputs 82. The multiplexer 84 continually sequences through all of the sensor inputs 82. The data output from the multiplexer 84 enters the analog-to-digital converter 76 so as to convert the analog signal into digital output for the microcontroller 74. The digital outputs 86 and 88 are transmitted by suitable databuses as input into the microcontroller 74. The microcontroller, through the control, address, and data, buses maintains control of the data processing by determining when the multiplexer 84, the analog-to-digital converter 76, the RAM, and the display 90 are active in the manner in which they interact. This control is determined by the software which is stored in the ROM.

Figure 2:
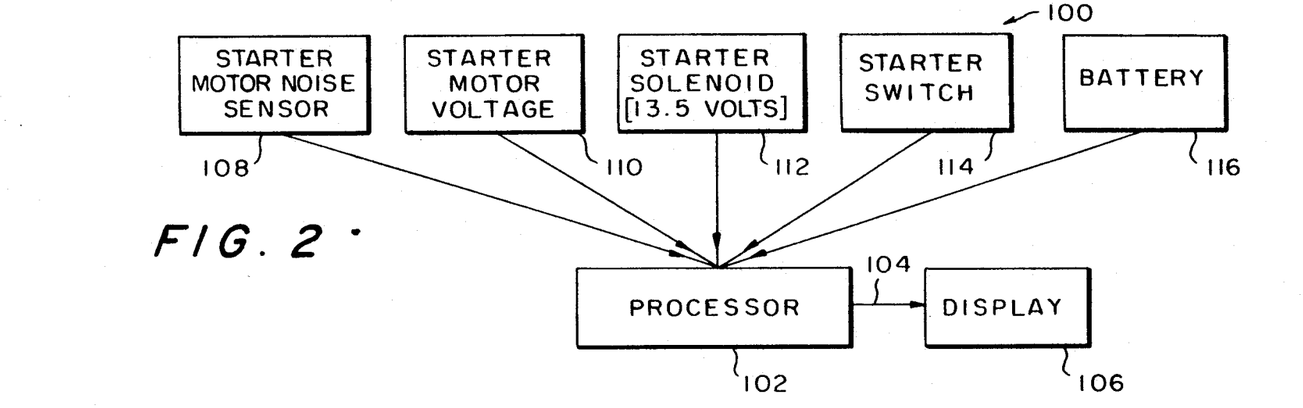
FIG. 2 is a block diagram showing the management system of the present invention as applied to sensing the realtime parameters for the starting system of a powered vehicle.

Referring to FIG. 2, there is shown at 100 the management system for the evaluation of the starter system of a vehicle. The management system 100 includes a microprocessor 102 that provides an output 104 to a display 106. The display 106 provides information to the operator of the powered vehicle as to the status of the starter system and the repair needed for the starter system problems. A variety of input sensors are provided so as to transmit condition information to the processor 102. The input sensors include a starter motor noise sensor 108, a starter motor voltage sensor 110, a starter solenoid sensor 112, a starter switch sensor 114, and a battery sensor 116.

The operation of the management system 100 is as follows. The battery sensor 116 will allow the battery condition to be displayed on display 106 as to how much the rate charge is and the percentage that the battery is charged (e.g., "battery 60% charged"). If the starter switch 114 is turned on (engaged), then 13.5 volts will go to the starter solenoid 112 and will be fed into the processor 102. This 13.5 voltage will be connected to the starter motor 110 and this voltage will be fed as input to the processor 102. The starter motor will turn the motor over to start the vehicle or motor of the vehicle. If the starter switch 114 does not feed 13.5 volts as input to the processor 102, then the display 106 will indicate that the starter switch is bad (the display 106 will present the words "Replace Switch"). If the starter switch is repaired properly, the display 106 will indicate that the starter switch is in proper condition. The display will read "Starter Switch O.K.". If the starter switch 114 feeds 13.5 volts to the processor 102 and the starter solenoid 112 does not put 13.5 volts into the input of the processor 102, then the display 106 will indicate a defective starter solenoid. If the repair is taken so as to replace the starter solenoid, the display 106 will indicate that the solenoid is in proper condition. If the starter switch 114 puts 13.5 volts into the input of processor 102 and if the starter solenoid 112 also puts 13.5 volts into the input of processor 102, and if the starter motor 110 has 13.5 volts on it and this is fed into the input of the processor 102, then when the motor does not turn over to start, the starter motor noise sensor 108 will feed zero voltage into the input of processor 102. The display 106 will indicate a bad starter motor (e.g., "Repair Starter Motor"). If the starter motor is repaired properly, then the display will indicate that the starter motor is in proper condition. In this instance, when all of the voltage goes to the proper equipment in the starter system, and the starter still does not turn over, then the problem must lie in the starter motor. Since everything is correct, the noise detector does not transmit its voltage to the processor 102 because, even though it has the correct voltage on it, it does not start. The starter motor noise sensor 108 would sense the noise and deliver a proper input to the processor 102 if the starter turned over.

Figure 3:
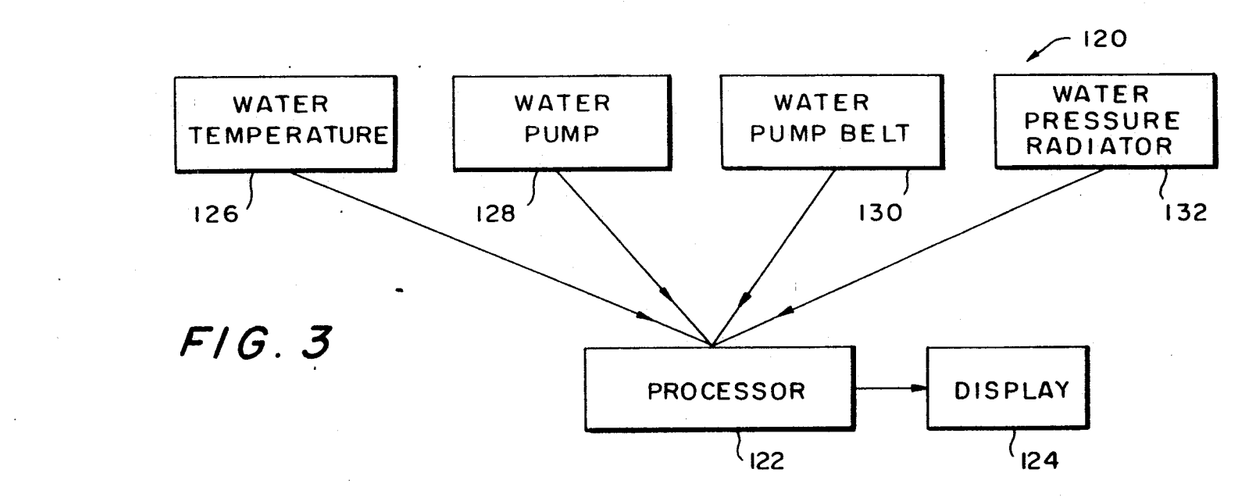
FIG. 3 is a block diagram showing the management system of the present invention as applied to the sensing of the realtime parameters associated with the motor cooling system.

FIG. 3 illustrates at 120 the management system of the present invention as applied to the motor cooling system. As can be seen, the management system 120 includes a microprocessor 122 and a suitable display 124. With reference to FIG. 2, the processor 122 can be the same processor as processor 102 of FIG. 2. Additionally, the display 124 can be the same display as display 106. In order to determine the condition of the motor cooling system, a variety of sensor inputs are directed toward processor 122. In particular, management system 120 includes a water temperature sensor 126, a water pump sensor 128, a water pump belt sensor 130, and water pressure sensor 132.

The motor cooling system is composed of water pumped through the motor, the radiator, the hoses, and other items, in order to prevent the motor from becoming overheated. If any one of the inputs 126, 128, 130, and 132 starts to show abnormal conditions it will affect the rest of the inputs. In other words, with the motor cooling system, the inputs are all interrelated and the interaction among them determines the condition of the cooling system.

If the water temperature 126 becomes abnormal, the problem can be the water pump 128, the water pump belt 130, or the water pressure 132. The processor 122 will analyze each of the inputs in order to tell the operator of the vehicle the item to repair. If the water pressure radiator 132 has a leak, the pressure signal to the processor 122 will indicate a lower water pressure signal. If the water temperature 126 is proper to the processor 122 and if the water pump 128 provides a proper signal to the processor 122 and if the water pump belt signal 130 is normal, then the processor will analyze these inputs and indicate on the display 124 that there is a leak in the water pressure radiator 132 or in the hoses associated therewith. The display 124 will advise the operator to repair the radiator or hoses. After repairs are made to the radiator and hoses, the processor 122 will analyze the repairs so as to determine whether the repairs are correct and whether the system is properly functional. The display 124 will indicate whether the motor cooling system is properly functional or not.

As another example, if the water pump belt 130 breaks, the input signal from the water pump belt sensor 130 will be zero. In this instance, the water temperature signal 126 will be above normal, the water pump noise voltage input 128 will be zero, and the water pressure 132 will be above normal. The processor 122 analyzes these inputs, and their effect on one another, and displays that the water pump belt 130 is broken. The display 124 can also provide the indication to "Replace Belt". If the belt is properly repaired, the processor 122 will see the normal inputs and interaction and will display that the repairs are correct by stating "Water Cooling System O.K.". If repairs are not correct, the processor 122 will continue to indicate on display 124 that the water cooling system needs repair.

Figure 4:
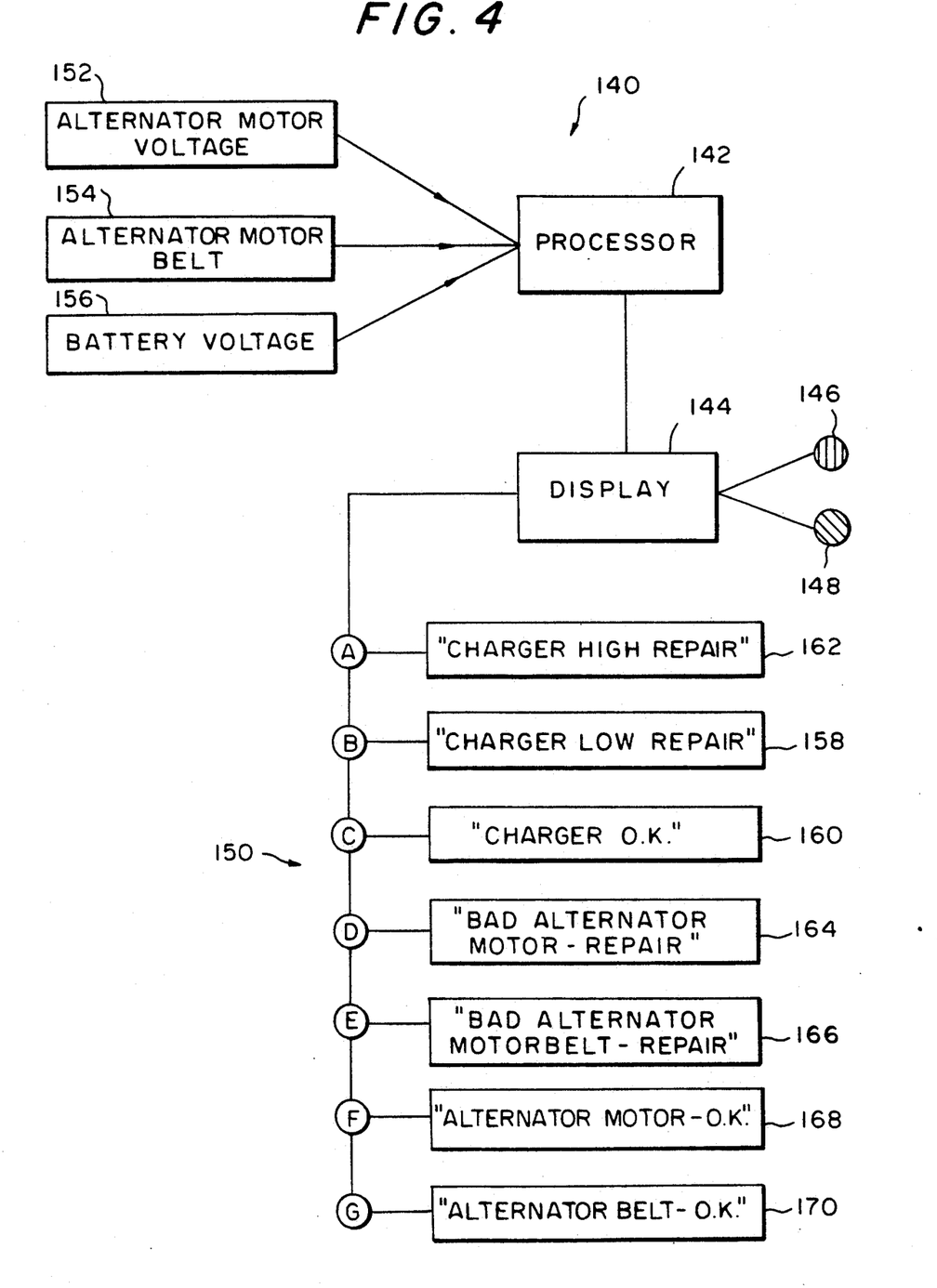
FIG. 4 is a block diagram showing the management system of the present invention as applied to the charging system of a powered vehicle.

FIG. 4 illustrates the management system 140 of the present invention as applied to the charging system of a powered vehicle. As can be seen, management system 140 includes a processor 142 that is connected to a display 144. Display 144 includes a red light 146 and a green light 148. Display 144 also is suitable for displaying various worded messages 150. The processor 142 receives inputs from an alternator motor voltage sensor 152, an alternator motor belt sensor 154, and a battery voltage sensor 156. Each of these items interact so as to provide a proper display as to the condition of the charging system of the powered vehicle.

The processor 142 begins to continually scan the battery voltage 156 in one-second intervals. The processor 142 computes an average during that one-second interval and stores that average in the processor's RAM. The average from the previous one-second interval is replaced by the average from the current one-second interval. This one-second average is used to determine the condition of the charging system (too high or too low or o.k.). In this manner, the charging system is continually monitored and evaluated in real-time.

The processor 142 receives inputs from the sensors 152, 154, and 156 continually at 250 times per second and updates this information every second. Any slight change in any input affects the total evaluation of the battery charging system. The evaluation of the battery charging system is based on the amount of charge which is being put into the battery over a given length of time. If the alternator motor voltage 152 feeds an average voltage to processor 142 between 13.5 volts and 14.5 volts, the display 144 will indicate that the charging system is properly functional. If the alternator motor 152 feeds a voltage which is too low to the processor 142, then the display 144 will indicate that the charge is low and that the alternator should be repaired. In particular, the display 144 will indicate message 158. Once the alternator is repaired, then the display 144 will present message 160, which reads "Charger O.K."

If the alternator motor 152 feeds an average voltage of 14.5 volts or greater to the processor 142, then the display 144 will indicate that the charge is high and that the alternator should be repaired. In this situation, the display 144 will display message 162 which is "Charger High--Repair". After the repair, the display 144 should indicate message 160 which is "Charger O.K."

If the alternator belt sensor 154 indicates that the belt is properly functional and is turning the alternator and if the noise detector on the alternator motor 152 indicates that the motor is turning and if the output voltage from the alternator motor 152 is zero, then the alternator is bad. The processor 142 will transmit a signal to display 144 to indicate that the alternator is bad and that it should be repaired. As such, display 144 will show message 164 stating "Bad Alternator Motor--Repair". Once the repairs are carried out, then the readings will return to normal and the display will flash message 160 that the charging system is properly functional. Additionally, green light 148 will flash to indicate that everything is properly functional.

In the case of the situation in which no signal is coming from the noise detector on the alternator motor and if the alternator belt rotation sensor 154 indicates that the alternator belt is rotating, then the processor 142 will indicate that the alternator motor is bad and that the alternator motor should be repaired. Once again, message 164 will flash on display 144. Additionally, red light 146 will become illuminated. When the alternator motor is repaired, the green light 148 will illuminate and message 160 will flash on display 144.

If the sensor from the alternator motor belt stops sending a signal to processor 142, then the alternator voltage output from sensor 152 will be zero to the processor 142. Additionally, the charge to the battery 156 will be zero. The display will then indicate message 166 which is "Bad Alternator Motor Belt--Repair". When the alternator motor belt is repaired, message 160 will be presented on display 144. Additionally, when the repairs are completed, message 168 "Alternator Motor---O.K." and message 170 "Alternator Belt--O.K." will also flash on display 144.

Figure 6:
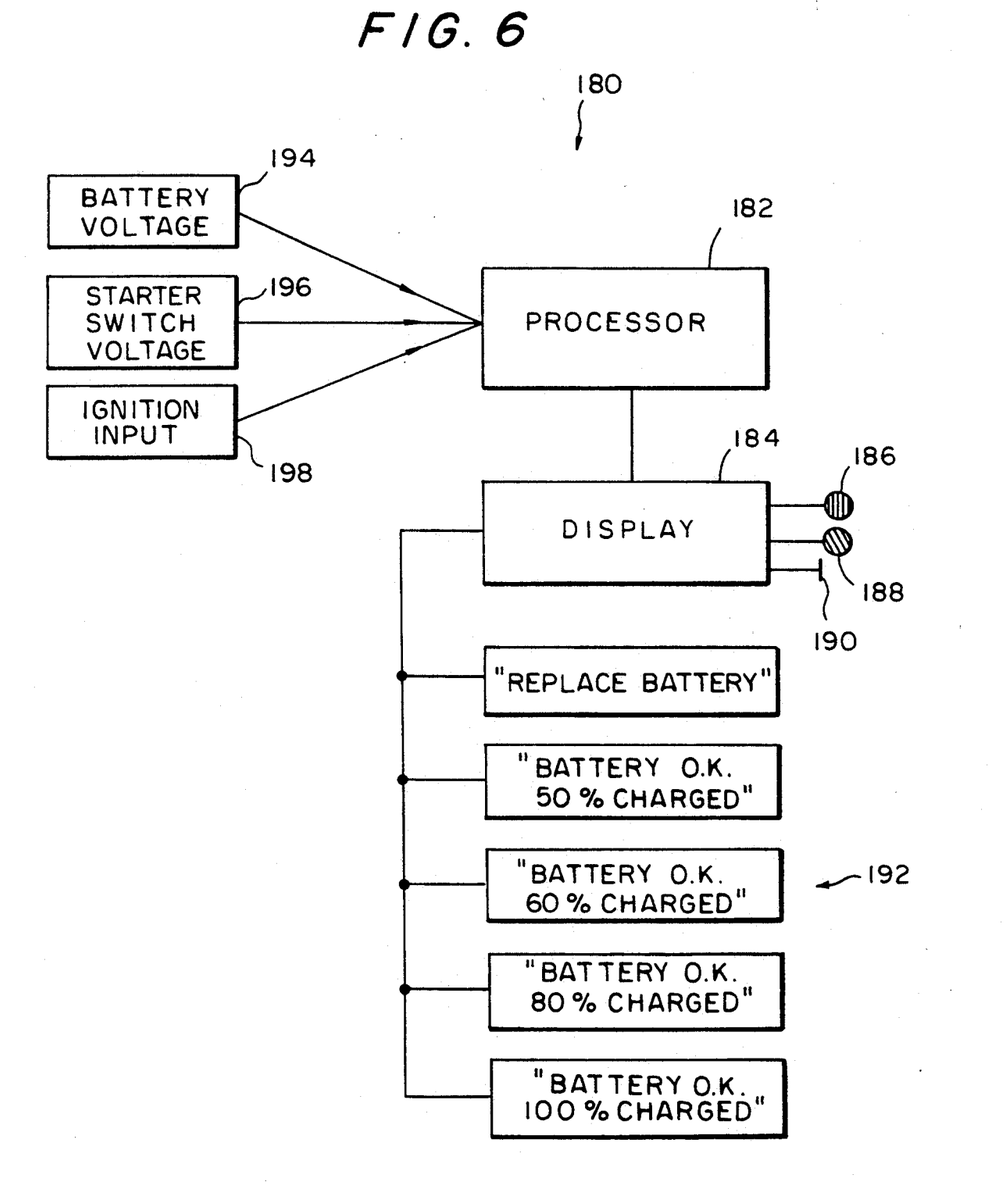
FIG. 6 is a block diagram showing the management system of the present invention as applied to the sensing of battery condition.

Referring to FIG. 6, there is shown at 180 the management system of the present invention as applied to the detection of battery condition in a powered vehicle. Management system 180 includes a processor 182 that provides a suitable output so as to illuminate display 184. Display 184 includes a red light 186, a green light 188 and an audio output 190. Additionally, display 184 can present worded displays 192. The processor 182 receives inputs from a battery voltage sensor 194, a starter switch voltage sensor 196 and an ignition input sensor 198.

When the ignition to the powered vehicle is turned off, the processor 182 continually scans the battery voltage 194 at 250 cycles per second and stores this information on the processor's RAM. For each one-second interval, the processor 182 computes and averages voltage for that one-second interval. The average from the previous one-second interval is replaced by that of the present interval and stored in the processor's RAM.

When the starter switch 196 is turned to the accessory position, the twelve volts from the starter switch 196 is connected to the accessory input which signals the processor 182 to stop scanning the vehicle battery voltage 194 and wait for a twelve volt signal to be applied to the ignition input 198. When the starter switch 196 is turned to the start position, the twelve volt signal is connected to the ignition input 198 and signals the processor 182 to start scanning the battery voltage 194. When the ignition input signal returns to zero, the processor 182 stops scanning the battery voltage 194 and computes the minimum battery voltage during the start interval as well as the average battery voltage during the start interval. The processor 182 will determine the condition of the battery by computing a battery charge level. This is computed from the average battery voltage when the starter switch is in the off position and from the minimum voltage and the average battery voltage when the starter switch was in the start position. The battery charge level may be presented on display 184 by way of messages 192. These messages includes "Replace Battery", "Battery O.K. 50% Charged", "Battery O.K. 60% Charged", "Battery O.K. 80% Charged", and "Battery O.K. 100% Charged". If the battery cannot hold a charge from the charging system, the battery is defective and will eventually lose its charge and become bad. The display 184 will tell the operator to replace the battery. Specifically, at the time that the battery becomes defective, the red light 186 will start blinking. When this battery is replaced with a functional battery, the red light 186 will stop blinking and the green light 188 will become illuminated. This indicates that the battery is able to hold a high percentage of the charge within itself, while being charged. Additionally, an audio signal 190 can be transmitted when the battery becomes bad. This will provide an additional cue to the operator of the powered vehicle to replace the battery.

The present invention provides an automatic, real-time, continuous evaluation of systems within the powered vehicle. The management system of the present invention will continue to tell the operator of the degradation of the system or of an actual breakdown of a component that prevents the system from functioning properly. The system also informs the operator as to what needs to be repaired. This provides the information to the operator of the vehicle so that the operator of the vehicle can decide when to fix the problem and allows the operator of the vehicle to shop around for costs. The present invention also eliminates the need to hire a person, such as a mechanic, to determine the specific problem. In particular, the present invention acts as a diagnostic instrument and allows the unskilled operator of the powered vehicle to determine the repair which is necessary. This prevents unnecessary charges for parts and labor that are unwarranted by the particular problem. After the repair is completed, the management system of the present invention will inform the operator of whether the repair has been done properly. If the repair has been properly carried out, then the system will indicate that the powered vehicle is functioning properly. The system further can evaluate whether the replacement parts are in good condition. For example, the present invention would indicate if a used battery were substituted during the course of a repair. The present invention allows the operator direct access to information generated from the powered system in order to enable the operator to make reasonable, logical management decisions. It allows the operator to cure costly problems and inefficiencies quickly and reliably.

The foregoing disclosure and description of the invention is illustrative and explanatory thereof. Various changes in the details of the present invention may be made within the scope of the appended claims without departing from the true spirit of the present invention. The present invention should only be limited by the following claims and their legal equivalents.

I claim:

1. A dynamic realtime management system for managing the condition of a powered vehicle comprising:
   a microprocessor for sensing a plurality of realtime parameters associated with said powered vehicle and having means for receiving condition information relating to battery charging components of said powered vehicle, said realtime parameters selected to determined battery condition, said realtime parameters being battery voltage, starter switch voltage, and ignition input; p1 a memory for storing sensed values of said realtime parameters and storing a plurality of programs for defining relationships between certain of said sensed values of said realtime parameters;
   a display interconnected to said microprocessor, said display for producing a humanly perceivable signal, said microprocessor programmed to automatically determine a plurality of unknown values relative to the conditions of said powered vehicle as a function of said sensed values of said realtime parameters by individually selecting said unknown values to be determined, said microprocessor for determining interactions between said sensed values using said stored programs, said microprocessor producing an interaction indication result, said microprocessor producing a condition output indicative of the relationship of said condition information and said interaction indication result, said condition output being a battery condition, said microprocessor for transmitting said condition output to said display; and
   a plurality of input sensor connected to said microprocessor so as to transmit said condition information to said microprocessor, said input sensors being interactively connected to a battery of said powered vehicle such that said microprocessor senses battery voltage, to an alternator motor such that said microprocessor senses alternator output voltage, to a starter switch such that said microprocessor senses starter switch voltage, and to a starter motor such that said microprocessor senses starter motor voltage.

2. The system of claim 1, further comprising:
   an analog-to-digital converter connected between said input sensors and said microprocessor, said analog-to-digital converter for converting an analog output of said input sensors into a digital input to said microprocessor.

3. The system of claim 1, further comprising:
   a power source connected to said microprocessor for supplying a voltage to said microprocessor, said power source independent of said battery of said powered vehicle.

4. The system of claim 1, said display being a visual monitor showing the battery charge level of said battery, said battery charge level being said condition output.

5. The system of claim 1, said display being a light signal indicative of said condition output.

6. The system of claim 1, said microprocessor programmed to determine interactions by commanding said certain realtime parameters be held constant to act as comparators in order to sense changes in other of said realtime parameters.

7. The system of claim 1, further comprising:
   a terminal interconnected to said microprocessor for selecting a desired condition output to be transmitted to said display.

8. The system of claim 7, said terminal for allowing management information to be input into said microprocessor, said microprocessor for interacting said management information with said realtime parameters.

9. A dynamic realtime management system for managing the condition of a battery charging system of a vehicle comprising:
   a plurality of input sensor connected to components associated with the charging system of said vehicle;
   a microprocessor connected to said input sensors for sensing a plurality of realtime parameters associated with said charging system, said input sensors transmitting condition information to said microprocessor, said plurality of input sensors comprising an alternator motor voltage sensor, an alternator motor belt sensor, and a battery voltage sensor, said microprocessor for receiving and interacting the realtime parameters as received by said input sensor;
   a memory for storing sensed values of said realtime parameters and for storing a program for defining relationships between certain of said sensed values of said realtime parameters; and
   a display connected to said microprocessor for producing a humanly perceivable signal indicative of charging system conditions, said microprocessor interacting each of the inputs from said sensors, said microprocessor programmed so as to interact the realtime parameters in the event of a single abnormal parameter, said microprocessor for transmitting a signal to said display indicative of a cause of said single abnormal parameter.

* * * * *